United States Patent Office 3,542,816
Patented Nov. 24, 1970

3,542,816
CYCLIC ORGANIC COMPOUNDS CONTAINING SULFONYLISOCYANATE GROUPS AND PROCESS FOR THEIR MANUFACTURE
Herbert Bestian, Fankfurt am Main, Dieter Gunther, Kelkheim, Taunus, and Hansjorg Vollmann, Frankfurt am Main, Germany, assignors to Farbwerke Hoechst Aktiengesellschaft vormals Meister Lucius & Bruning, Frankfurt am Main, Germany, a corporation of Germany
No Drawing. Filed Dec. 22, 1967, Ser. No. 692,653
Claims priority, application Germany, Dec. 29, 1966, F 51,102
Int. Cl. C07c *119/00, 127/00;* C07d *5/32*
U.S. Cl. 260—347.2                                9 Claims

ABSTRACT OF THE DISCLOSURE

Monocyclic or polycyclic organic compounds containing a sulfonylisocyanate group and a process for preparing them in which vinylsulfonylisocyanate is reacted with open-chained or isocyclic or heterocyclic 1.3-dienes.

---

The present invention relates to new cyclic organic compounds containing sulfonylisocyanate groups and process for their manufacture, in particular it relates to mono- or poly-nuclear cyclic organic compounds containing sulfonyl-isocyanate groups of the general formula

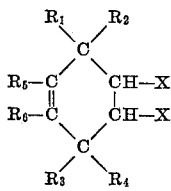

in which one radical X represents a hydrogen atom and the other radical X represents the group $SO_2$—NCO, $R_1$ represents a hydrogen, or a halogen atom, an aryl, cyano, or carboxylic acid ester radical, $R_2$ and $R_3$ represent hydrogen atoms or together the group —O—,

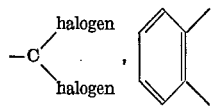

—$CH_2$—$CH_2$— or —$CH_2$—, $R_4$ represents a hydrogen, or a halogen atom or an alkyl group, $R_5$ and $R_6$ represent hydrogen- or halogen atoms or alkyl groups or together the groups —CH=CH—CH=CH— and in which the radicals $R_1$ and $R_5$ together with the radicals $R_3$ and $R_6$ may represent the grouping of the formula

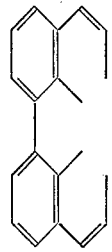

It is known, that sulfonylisocyanate with 1.3-dienes, such as furan react by adding a hydrogen atom to give carbonamide-N-sulfonyl derivatives (R. Graf, Ann. 661; p. 116 (1963)).

It has been found surprisingly that mono- or polynuclear cyclic organic compounds containing sulfonyliso-cyanate groups can be obtained by allowing to react vinylsulfonylisocyanate of the formula $$CH_2=CH—SO_2NCO$$

with open-chained or isocyclic or heterocyclic 1.3-dienes.

As 1.3-dienes can be used componuds for the process of the present invention which have in 1.3-position conjugated carbon double bonds, such as butadiene, 2.3-diakyl-butadiene, such as 2,3-dimethylbutadiene, 1-arylbutadiene, such as 1-phenylbutadiene, 1-cyano-butadiene, isoprene, cyclohexadiene, cyclopentadiene, hexahalogenocyclopenta-diene such as hexachlorocyclopentadiene, sorbic acid ester, containing 1-6 carbon atoms in the ester group, furan anthracene, perylene or methylanthrone.

The vinylsulfonylisocyanate is allowed to react between 0° C. and 250° C., advantageously between 30° C. and 150° C., if desired in a solvent or diluent together with the 1.3-dienes. As solvent or diluent aliphatic or aromatic hydrocarbons, such as petrol ether, hexane, benzene, xylene, chlorinated hydrocarbons such as methylene chloride, chloroform, chloronaphthalene or ether such as diethyl-, diisopropyl ether or dimethyl glycol ether can be used. Even strong polar solvents such as liquid sulfur dioxide can be used.

The process can be carried out at normal pressure. When using gaseous or low boiling dienes reaction can be carried out under pressure. In order to avoid a polymerization of the vinylsulfonylisocyanate and the dienes, which may take place, it may be advantageous to add inhibiting agents such as methylene blue or copper-I-salts, in amounts of 0.05–2 percent by weight referred to the vinylsulfonylisocyanate.

The molar ratio of the vinylsulfonylisocyanate to the diene can vary within wide limits, i.e. between about 1:0.5 and 1:10. Especially advantageous is a ratio of 1:1 to 1:3.

The sulfonylisocyanates prepared according to the process of the present invention are new compounds which, due to their reactive isocyanate groups, represent valuable intermediary products applicable for numerous organic synthesis.

For instance, they can be reacted with amines forming sulfonylureas, with alcohols forming urethanes or with dialkylamides under formation of amidines which represent valuable fungicides or blood sugar depressing agents. The sulfonylureas prepared by the reaction of 1,2,3,4,7,7-hexachloro - bicyclo - [2.2.1] - heptene - (2) - sulfonyl-isocyanate with p-chloro aniline or 3,4 - dichlorophenol represent, for example, very active fungicides against Peronospora and Cercospora. The reaction product of 7-oxa-bicyclo - [2.2.1] - heptene - (2) - sulfonylisocyanate-(5) with cyclohexylurea is a valuable blood sugar depressing agent.

The following examples serve to illustrate the invention but they are not intended to limit it thereto.

EXAMPLE 1

133 g. (1 mol) of vinylsulfonylisocyanate are heated to 80° C. and gassed with 1.3-butadiene. After 48 hours the reaction is interrupted and the batch is distilled. There are regained 74 g. of vinylsulfonylisocyanate and there are obtained 50 g. of cyclohexene-3-yl-sulfonylisocyanate boiling at 74° C. at a pressure of 0.1 mm. of mercury, corresponding to a yield of 60% of the theory, referred to vinylsulfonylisocyanate.

*Analysis.*—$C_7H_9NO_3S$ (molecular weight 187): Calculated: C, 44.6%; H, 4.8%; N, 7.5%; S, 17.1%. Found: C, 44.2%; H, 4.8%; N, 7.2%; S, 17.2%.

EXAMPLE 2

133 g. (1 mol) of vinylsulfonylisocyanate are heated to 100° C. for 8 hours under a pressure of 50 atmospheres of nitrogen in an autoclave together with 54 g. of butadiene and 0.1 g. of methylene blue. During the distillation of the reaction product there are obtained 50 g. of vinylsulfonylisocyanate and there are obtained 100 g. of cyclohexenylsulfonylisocyanate, corresponding to a yield of 84% of the theory, referred to the vinylsulfonylisocyanate.

EXAMPLE 3

133 g. (1 mol) of vinylsulfonylisocyanate are heated to 50° C. for 48 hours with 68 g. of furan. At a bath temperature of 50° C. the vinylsulfonylisocyanate which has not reacted and the furan are distilled off in vacuo at a pressure of 0.1 mm. of mercury. 42 g. of vinylsulfonylisocyanate and 22 g. of furan are regained. The residue is then submitted to a thin layer distillation in vacuo at 105° C. and at a pressure of 0.04 mm. of mercury. Under the conditions of this distillation resplitting in the components can be avoided. There are obtained 7-oxa-bicyclo-[2,2,1]-heptene-(2)-sulfonylisocyanate-(5).

*Analysis.*—$C_7H_7NO_4S$ (molecular weight 201.1): Calculated: C, 41.8%; H, 3.5%; N, 7.0%; S, 15.9%. Found: C, 41.4%; H, 3.4%; N, 7.3/; S, 16.5%.

The sulfonylisocyanate can be converted with methanol into the corresponding carbamic acid ester of the formula

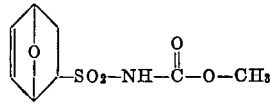

*Analysis.*—$C_8H_{11}NO_5S$ (molecular weight 233.1): Calculated C, 41.2%; H, 4.7%; N, 6.0%; S, 13.8%. Found: C, 40.9%; H, 4.6%; N, 6.2%; S, 13.7%.

EXAMPLE 4

266 g. (2 mols) of vinylsulfonylisocyanate and 546 g. (2 mols) of hexachlorocyclopentadiene are heated while stirring to 120° C. for 48 hours.

During a subsequent distillation there are obtained 74 g. of vinylsulfonylisocyanate and 148 g. of hexachlorocyclopentadiene.

There are obtained 550 g. 1.2.3.4.7.7-hexachloro-bicyclo-[2.2.1]-heptene-(2)-sulfonylisocyanate - (5) boiling at 100° C. and at a pressure of 0.1 mm. of mercury, corresponding to a yield of 94% of the theory, referred to the vinylsulfonylisocyanate.

*Analysis.*—$C_8H_3Cl_6NO_3S$ (molecular weight 406): Calculated: C, 23.7%; H, 0.7%; Cl, 52.2%; N, 3.5%; S, 7.9%. Found: C, 23.6%; H, 0.9%; Cl, 52.3%; N, 3.6%; S, 7.9%.

EXAMPLE 5

133 g. (1 mol) of vinylsulfonylisocyanate are heated under reflux for 24 hours with 82 g. (1.2 mol) of isoprene and 0.2 g. of methylene blue. Subsequent distillation supplies 40 g. of vinylsulfonylisocyanate which has not reacted and 90 g. of methyl-cyclohexene-3-yl-sulfonylisocyanate boiling at 83° C. at a pressure of 0.2 mm. of mercury, corresponding to a yield of 64% of the theory, referred to the vinylsulfonylisocyanate.

*Analysis.*—$C_8H_4NO_3S$ (molecular weight) 202.1: Calculated: C, 47.8%; H, 5.5%; N, 7.0%; S, 15.9%. Found: C, 47.6%; H, 5.5%; N, 7.0%; S, 16.2%.

EXAMPLE 6

133 g. (1 mol) of vinylsulfonylisocyanate are heated to 70° C. for 24 hours with 100 ml. of benzene, 92 g. of isoprene, and 0.2 g. of methylene blue. Then, during distillation 45 g. of vinylsulfonylisocyanate are regained. There are obtained 108 g. of methylcyclohexenyl-sulfonylisocyanate, corresponding to a yield of 81% of the theory, referred to the vinylsulfonylisocyanate.

EXAMPLE 7

71 g. (0.4 mol) of anthracene and 53.5 g. (0.4 mol) of vinylsulfonyl-isocyanate are heated to 130° C. for 50 hours with 250 ml. of chloro-benzene. Then the solvent and the vinylsulfonylisocyanate which has not reacted are distilled off at 80° C. of sump temperature at a pressure of 0.4 mm. of mercury. The residue contains the sulfonylisocyanate formed by the Diels-Alder-reaction, which can not be distilled without decomposition, but which is sufficiently pure for each following reaction.

The residue can, for example, be dissolved in methylene chloride and methanol can be added. After elimination of the solvent there is obtained a crystalline, colourless product, from which by recrystallization from methanol 87 g. (63% of the theory) of a crystalline sulfonylcarbamic acid methyl ester of the formula

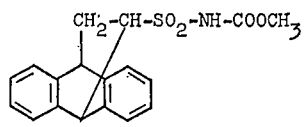

having a melting point of 180–182° C. can be isolated.

*Analysis.*—$C_{18}H_{17}NO_4S$ (molecular weight 343.4): Calculated: C, 63.0%; H, 5.0%; N, 4.1%; S, 9.3%. Found: C, 62.9%; H, 5.2%; N, 4.2%; S, 9.6%.

We claim:

1. A compound of the formula

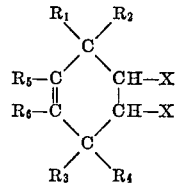

in which one of the radicals X stands for —$SO_2$—NCO and the other X stands for hydrogen, $R_1$ represents hydrogen, chlorine, bromine, phenyl, cyano or carbalkoxy moiety containing 2 to 7 carbon atoms, $R_2$ and $R_3$ are hydrogen or represent together —O—,

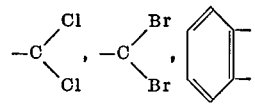

—$CH_2$—$CH_2$— or —$CH_2$—, $R_4$ is hydrogen, chlorine, bromine or alkyl having 1 to 4 carbon atoms, $R_5$ and $R_6$ are hydrogen, chlorine, bromine or alkyl containing 1 to 4 carbon atoms or represent together

—CH=CH—CH=CH—

2. The compound of the formula

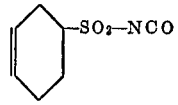

3. The compound of the formula

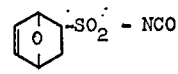

4. The compound of the formula

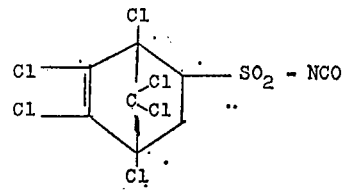

5. The compound of the formula

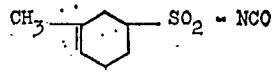

6. The compound of the formula

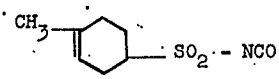

7. The compound of the formula

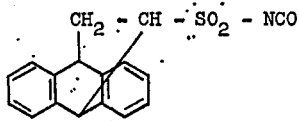

8. Process for preparing compounds of the formula

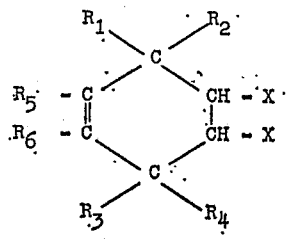

in which one of the radicals X stands for —SO$_2$—NCO and the other X stands for hydrogen, R$_1$ represents hydrogen, chlorine, bromine, phenyl, cyano or carbalkoxy moiety containing 2 to 7 carbon atoms, R$_2$ and R$_3$ are hydrogen or represent together —O—,

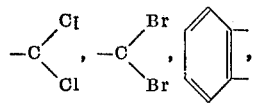

—CH$_2$—CH$_2$— or —CH$_2$, R$_4$ is hydrogen, chlorine, bromine or alkyl having 1 to 4 carbon atoms, R$_5$ and R$_6$ are hydrogen, chlorine, bromine or alkyl containing 1 to 4 carbon atoms or represent together

—CH=CH—CH=CH— which comprises reacting vinylsulfonylisocyanate of the formula

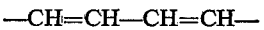

with a compound of the formula

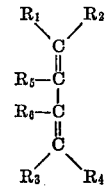

in which R$_1$, R$_2$, R$_3$, R$_4$, R$_5$ and R$_6$ have the meanings defined above at temperatures between 0° and 250° C.

9. A process as claimed in claim 8, wherein the reaction is carried out at a temperature between 30° C. and 150° C.

References Cited
UNITED STATES PATENTS
1,944,731  1/1934  Diels et al. _____ 260—346.6

ALEX MAZEL, Primary Examiner

B. I. DENTZ, Assistant Examiner

U.S. Cl. X.R.

260—464, 468, 545, 553, 999